Nov. 24, 1925.  
M. J. GRIFFIN  
HORSESHOE  
Filed Oct. 27, 1922  
1,562,635
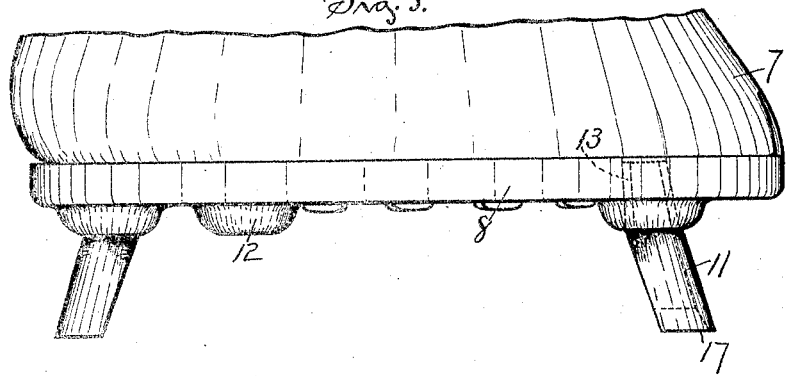
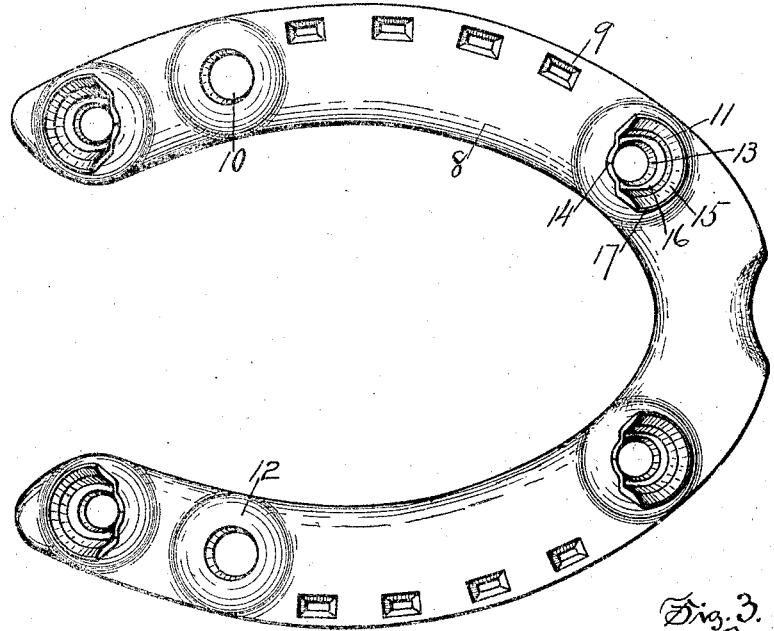
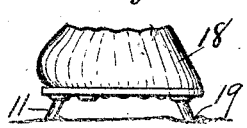
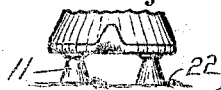
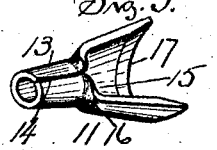
INVENTOR  
Michael J. Griffin,  
by Arthur B. Jenkins.  
ATTORNEY.

Patented Nov. 24, 1925.

1,562,635

UNITED STATES PATENT OFFICE.

MICHAEL J. GRIFFIN, OF HARTFORD, CONNECTICUT.

HORSESHOE.

Application filed October 27, 1922. Serial No. 597,344.

*To all whom it may concern:*

Be it known that I, MICHAEL J. GRIFFIN, a citizen of the United States, and a resident of Hartford, in the county of Hartford and State of Connecticut, have invented new and Improved Horseshoes, of which the following is a specification.

My invention relates to the class of devices that are commonly attached to the hoofs of horses and other animals to prevent slipping and also to prevent undue wear, and an object of my invention, among others, is to provide a device of this class for effectually preventing slipping under the various conditions of use.

One form of device embodying my invention and in the construction and use of which the objects herein set out, as well as others, may be attained, is illustrated in the accompanying drawings, in which—

Figure 1 is a view in side elevation of the lower portion of a horse's hoof with my improved shoe attached thereto;

Fig. 2 is a bottom view of my improved shoe;

Fig. 3 is a detail view of my improved horseshoe calk as employed in the shoe illustrated in Figs. 1 and 2;

Fig. 4 is an illustrative view showing the action of the shoe and calks under force applied forwardly;

Fig. 5 is a similar view showing the action of the calks under force applied rearwardly, or when the animal is exerting a pulling force; and Fig. 6 is another similar view illustrating the action of the calk under force applied laterally.

It has heretofore been proposed to construct a horseshoe with a calk, the wearing part of which is hollow to a greater or lesser degree, some of such calks comprising a wall extending entirely around the calk, the edge of the wall being sharpened, and others of various shapes comprising a wall extending only partially around the calk.

In order to provide sufficient strength to resist the force of blows by the action of a horse's hoof in use, the walls of calks above referred to have been of considerable thickness to resist rupture under such uses. I have found, by experiment, that if these walls be disposed in a certain manner that a thinner wall than has heretofore been employed may be used that will successfully resist rupture under the ordinary conditions of use, and at the same time the resistance to slipping is greatly increased in my improved shoe and calk therefor.

In the accompanying drawings the numeral 7 indicates the lower part of a horse's hoof having my improved shoe 8 attached thereto in any desired manner, as by means of nails passed through holes 9. Any other suitable means for attaching the shoe may be employed.

This shoe is provided with openings 10 arranged in such numbers as may be desired at the toe and at the heel for the reception of calks 11. In the preferred form of construction bosses 12 are provided as a means for thickening the shoe at the parts where the holes 10 are formed. In the structure herein shown two holes are shown in each side of the shoe at the heel and one on each side of the shoe at the toe for the reception of such calks.

My improved calk comprises a stem 13 that is preferably tapered to fit the holes 10 which are likewise tapered, this stem being split as at 14. The stem is preferably of tubular shape and the body 15 is preferably of curved or concavo-convex form, as especially illustrated in Fig. 3. This body is formed by constructing a shoulder 16 at the base of the stem and the body flares outwardly from this shoulder to the edge 17 that may be sharpened to a greater or lesser degree.

When these calks are attached to the shoe by locating the stems 13 in the holes 10 the flaring body 15 will cause a sure grip to be obtained upon a surface, as upon frozen ground or ice, in all directions, the body being preferably of a size exceeding a semicircle, although I do not restrict my invention to such a structure. When the animal is traveling forward and the hoof 18 of a front foot strikes the ground this forward inclination of the cutting edge of the body will cause it to sink into the surface, as illustrated at 19 in Fig. 4. When a force is exerted as in pulling, which is excessive as to the hoof 20 of the rear foot of an animal, the calks will sink into the ground as illustrated at 21 in Fig. 5. Many horses have a lateral movement of the hoof, both front and rear, of various sorts, and when such lateral movement takes place the peculiar shape of the calk enables it to successfully penetrate the ground, as illustrated at 22 in Fig. 6.

This flaring shape of the calk causes the strains exerted upon the body 15 to be transmitted lengthwise along the body rather than to a degree crosswise thereof should the walls of the body be parallel to the axis of the stem, and a result is that this body may be made thinner than in structures heretofore employed and yet successfully resist rupture under ordinary conditions of use, and a further advantage of this flare or bell shape of the body is in the successful resistance to slipping movement in all directions, as above explained.

In order to increase the effects of this flare or bell shape of the calk body I preferably make the holes 10 inclined to increase the inclination at the place where the body of the calk projects with respect to the shoe, the holes at the toe of the shoe being inclined from the bottom of the shoe backwardly toward the top of the shoe, and the holes at the heel being inclined forwardly from the bottom to the top of the shoe, as shown in Fig. 1, and the inclination of the holes 10 and the degree of flare of the body 15 of the calk may be relatively arranged as may be desired to produce the ends sought.

In accordance with the provisions of the patent statutes I have described the principles of operation of my invention, together with the device which I now consider to represent the best embodiment thereof; but I desire to have it understood that the device shown is only illustrative, and that the invention may be carried out by other means.

I claim—

1. A horseshoe having holes therein with the axes thereof inclined in opposite directions in the direction of depth of the shoe, and shoe calks each having a stem and a body of concavo-convex shape flared outwardly from the stem to the outer edge of the calk.

2. A horseshoe having holes therein with the axes thereof inclined in opposite directions in the direction of depth of the shoe, and shoe calks each having a stem and a body of concavo-convex shape flared outwardly from the stem to the outer edge of the calk, said flared portion being inclined in the same general direction as the inclination of said axes.

MICHAEL J. GRIFFIN.